(12) United States Patent
Fink et al.

(10) Patent No.: US 9,403,520 B2
(45) Date of Patent: Aug. 2, 2016

(54) VALVE FOR CONTROLLING FLUIDS

(75) Inventors: Reinhard Fink, Mannheim (DE); Dirk Foerch, Neuenstadt/Stein (DE); Thomas Weitze, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 505 days.

(21) Appl. No.: 13/825,816

(22) PCT Filed: Jul. 27, 2011

(86) PCT No.: PCT/EP2011/062885
§ 371 (c)(1),
(2), (4) Date: Oct. 4, 2013

(87) PCT Pub. No.: WO2012/038122
PCT Pub. Date: Mar. 29, 2012

(65) Prior Publication Data
US 2014/0014869 A1    Jan. 16, 2014

(30) Foreign Application Priority Data
Sep. 24, 2010    (DE) .......................... 10 2010 041 300

(51) Int. Cl.
*F16K 1/42* (2006.01)
*B60T 17/04* (2006.01)
*B60T 8/36* (2006.01)

(52) U.S. Cl.
CPC ............... *B60T 17/04* (2013.01); *B60T 8/3615* (2013.01); *F16K 1/42* (2013.01)

(58) Field of Classification Search
CPC .......... F16K 1/42; B60T 17/04; B60T 8/3615
USPC ..................... 251/359, 318, 251.15
See application file for complete search history.

(56) References Cited

U.S. PATENT DOCUMENTS

| | | | |
|---|---|---|---|
| 2,846,182 A | 8/1958 | Charlton | |
| 3,658,295 A | 4/1972 | Paine et al. | |
| 6,264,431 B1* | 7/2001 | Triezenberg | 417/36 |
| 7,322,557 B2* | 1/2008 | Nagao et al. | 251/63.5 |
| 2005/0151109 A1 | 7/2005 | Koester | |
| 2006/0196577 A1 | 9/2006 | Nagao et al. | |

FOREIGN PATENT DOCUMENTS

| | | |
|---|---|---|
| JP | 56-113273 U | 9/1981 |
| JP | 59-39785 U | 3/1984 |
| JP | 59-140967 A | 8/1984 |
| JP | 6-280781 A | 10/1994 |
| JP | 11-336925 A | 12/1999 |
| JP | 2005-163874 A | 6/2005 |
| JP | 2007-518041 A | 7/2007 |

OTHER PUBLICATIONS

International Search Report corresponding to PCT Application No. PCT/EP2011/062885, mailed Jan. 2, 2012 (German and English language document) (5 pages).

* cited by examiner

*Primary Examiner* — Marina Tietjen
(74) *Attorney, Agent, or Firm* — Maginot, Moore & Beck LLP

(57) ABSTRACT

The disclosure relates to a valve for controlling fluids, including a valve body defining a passage opening, a tapering valve seat formed on the valve body, a closing element configured to open up and to close off the passage opening at the tapering valve seat, and a protruding region adjoining the tapering valve seat. The protruding region extends over only part of a circumference of the tapering valve seat.

17 Claims, 2 Drawing Sheets

VALVE FOR CONTROLLING FLUIDS

This application is a 35 U.S.C. §371 National Stage Application of PCT/EP2011/062885, filed on Jul. 27, 2011, which claims the benefit of priority to Ser. No. DE 10 2010 041 300.3, filed on Sep. 24, 2010 in Germany, the disclosures of which are incorporated herein by reference in their entirety.

BACKGROUND

The present disclosure relates to a valve for controlling fluids and in particular a non-return valve for a brake system of a vehicle Various forms of valves for controlling fluids are known from the state of the art. One sphere of application of such valves, for example, is for controlling the hydraulic fluid in brake systems. Efforts have recently been made to reduce the size of such systems and also all components, particularly with a view to reducing the weight and overall dimensions. Certain minimum flow values must nevertheless be ensured when used in brake hydraulics. Furthermore any flow resistance through the valve must not be excessive. When reducing the dimensions, however, it may be necessary to increase the valve lift. This, however, increases the risk of the valve closing element being lost. It would therefore be desirable to have an inexpensive valve of small overall dimensions, in which it is possible to avoid loss of the closing element.

SUMMARY

The valve according to the disclosure for controlling fluids, by contrast has the advantage that a risk of losing the closing element is significantly reduced. The valve according to the disclosure is nevertheless very inexpensive to manufacture and has only very small dimensions. According to the disclosure this is achieved in that the valve comprises a protruding area, which adjoins a valve seat. The protruding area only extends over part of the circumference of the valve seat. The protruding area prevents a closing element being removed too far from the valve seat and being lost, whilst nevertheless ensuring a high rate of flow through the opened valve, since the protruding area is not present over the entire circumference of the valve seat. When the valve is opened, the protruding area therefore prevents the closing element being pushed aside deflected laterally by the fluid flow through the valve and in extreme cases possibly being lost, without increasing any flow resistance.

The protruding area is preferably integrally formed with the valve seat. This makes it especially simple and inexpensive to manufacture.

The protruding area is more preferably of a castellated formation having a plurality of elements protruding in the lifting direction of the closing element, which are separated from one another by spaces. The protruding elements prevent the closing element being lost, fluid also being able to flow between the protruding elements when the valve is opened.

The spaces between the protruding elements of the castellated area are also preferably formed in a circumferential direction in such a way that an arc length of the spaces in a circumferential direction is equal to an arc length of the protruding elements in a circumferential direction.

The protruding area is more preferably only provided on less than one half of the entire circumferential length and more than a third of the circumferential length of the valve seat.

According to a further preferred development of the disclosure the protruding area has a length in the lifting direction of the closing element which is greater than a lift of the closing element. This affords an especially secure retention of the closing element on the valve.

The valve seat is preferably of tapered design.

The valve seat also preferably merges into an edge area running round the entire circumference, the protruding area then being formed on the edge area.

According to a further preferred development of the disclosure the closing element comprises a sealing cone for sealing off against the valve seat, in order to provide a large sealing area.

The valve according to the disclosure is more preferably embodied as a non-return valve and further comprises a stop for limiting a lift of the closing element.

The present disclosure further relates to a brake device having a valve according to the disclosure, in particular a non-return valve according to the disclosure.

BRIEF DESCRIPTION OF THE DRAWINGS

Preferred exemplary embodiments of the disclosure are described in detail below with reference to the accompanying drawing, in which.

DETAILED DESCRIPTION

A valve 1 for controlling fluids according to a first preferred exemplary embodiment of the present disclosure is described below with reference to FIGS. 1 to 3. The valve 1 in the first exemplary embodiment is a non-return valve, which is used in a brake circuit.

Figure 3:
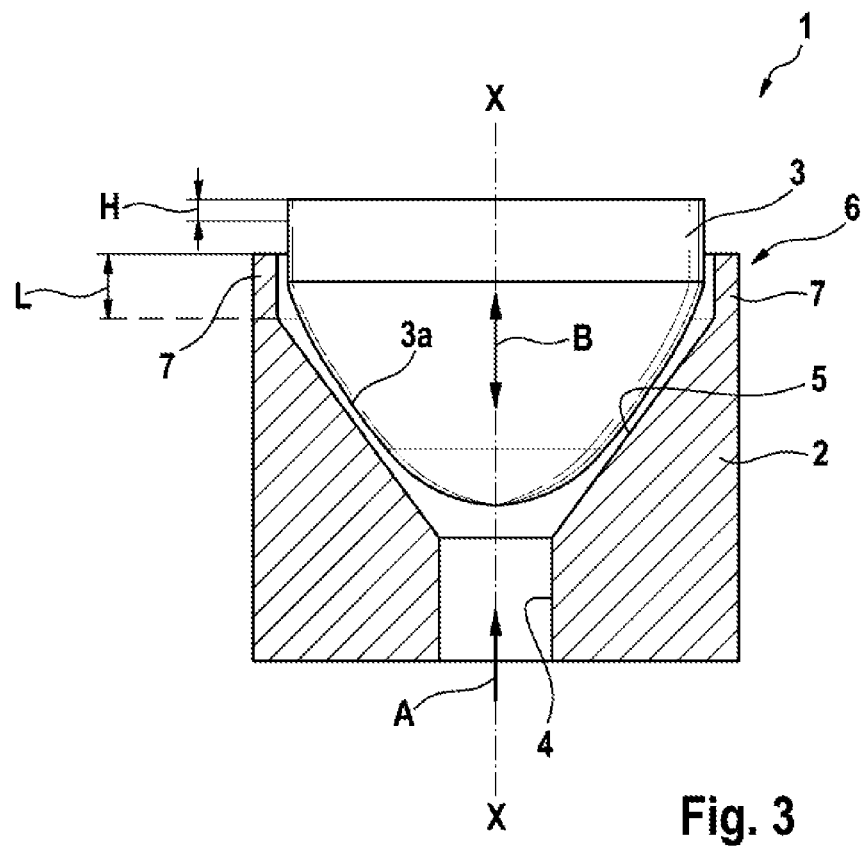
FIG. 3 shows a schematic sectional view of the valve in FIG. 1.

As can be seen from FIG. 3, the valve 1 comprises a valve body 2 having a passage opening 4. A conically tapering valve seat 5 is furthermore formed on the valve body 2. A closing element 3 opens the passage opening 4 and tightly seals off the passage opening on the valve seat 5. Here the closing element 3 is formed with a sealing cone 3a. The closing element 3 is closed by the application of a differential pressure. A movement of the closing element 3 is indicated by the double arrow B in FIG. 3. Here the direction of movement of the closing element 3 is in the direction of a central axis X-X of the valve.

The arrow A in FIG. 3 shows a direction of flow through the non-return valve. As can further be seen from FIGS. 1 and 2, in particular, an area 6 is formed protruding towards the end of the valve seat 5 in the direction of flow. The protruding area 6 is of a castellated formation. The protruding castellated area 6 comprises multiple protruding elements 7, which in the circumferential direction are each separated from one another by a space 8. The protruding elements 7 here protrude in an axial direction and are of an arched formation. As can be seen from FIG. 1, the protruding castellated area 6 is formed only on one half of the outer circumference of the valve seat 5.

Figure 1:
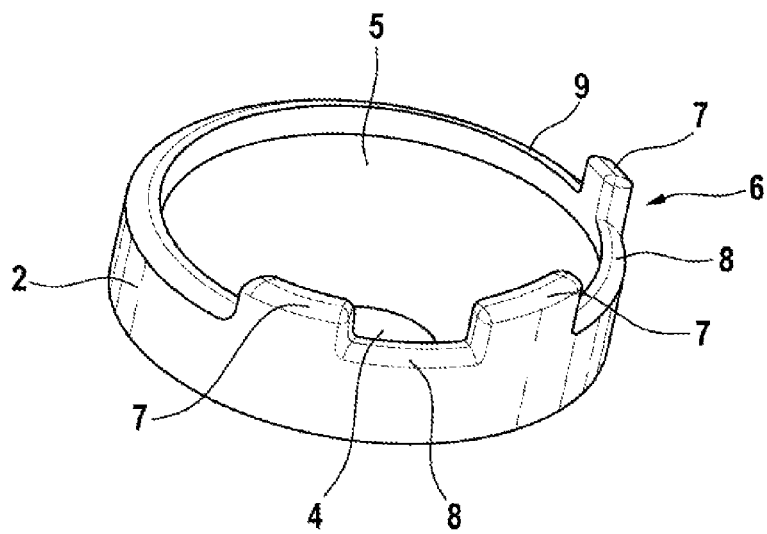
FIG. 1 shows a perspective view of a valve body for a valve according to the disclosure in a first exemplary embodiment of the disclosure.
Figure 2:
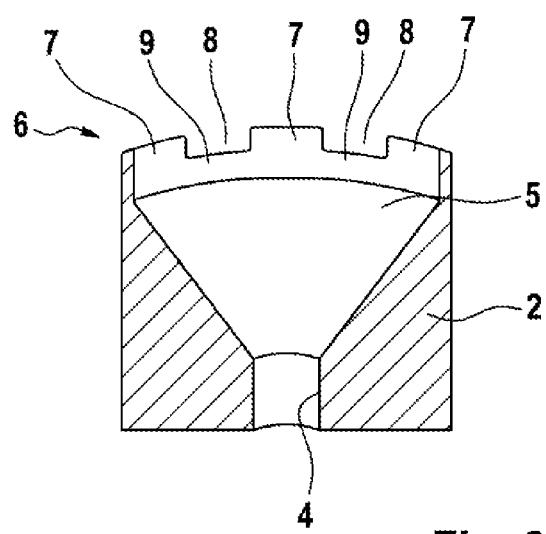
FIG. 2 shows a schematic sectional view of the valve body in FIG. 1.

As can further be seen from FIG. 1, an edge area 9, which runs around the entire circumference but which has only a small axial height, is first formed on the valve seat 5. The protruding elements 7 of the protruding, castellated area 6 are then arranged on this edge area 9. In this exemplary embodiment the valve body 2 is provided together with the edge area 9 and the protruding area 6 as one integral component, which can be manufactured by injection molding, for example.

As can further be seen from FIG. 1, an arc length of the protruding elements 7 in a circumferential direction is equal to an arc length of the spaces 8. This serves to ensure that the protruding elements 7 do no occupy too large an area, which might inhibit a flow of the fluid through the opened valve. The protruding elements 7 nevertheless have a length L in an axial direction X-X which is greater than a lift H of the closing element 3. The protruding elements 7 thereby prevent the closing element 3 from being pushed laterally out of the valve seat 5 and being lost when the valve is opened. Here the protruding elements 7 exercise a retaining function without excessively reducing a rate of flow and without the occurrence of an unwanted, large flow resistance on the opened valve.

Figure 4:
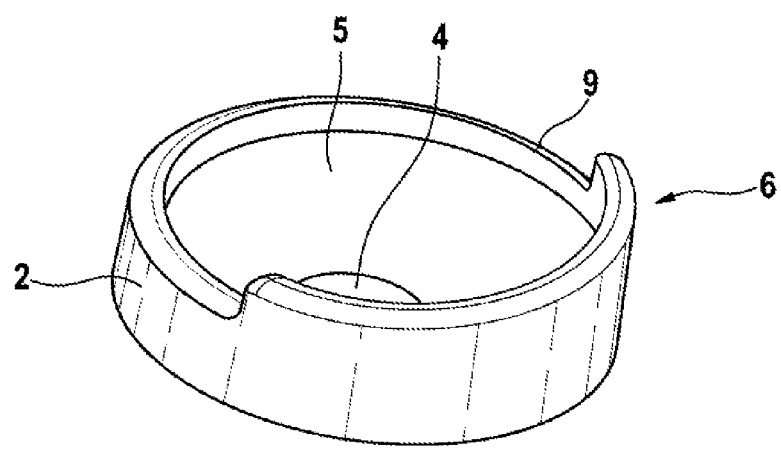
FIG. 4 shows a perspective view of a valve body for a valve according to the disclosure in a second exemplary embodiment of the disclosure.

A valve body 2 according to a second exemplary embodiment of the disclosure is described below with reference to FIG. 4, the same or functionally identical parts being denoted by the same reference numerals as in the first exemplary embodiment.

In contrast to the first exemplary embodiment, the valve body 2 in the second exemplary embodiment comprises one uninterrupted, continuous, protruding area 6. In the second exemplary embodiment, therefore, the protruding area 6 is only provided over part of the circumference of the valve seat 5. In this exemplary embodiment a circumferential length of the protruding area 6 is between one third and one half of the overall circumference of the valve seat 5. Providing a protruding area 6 that is only provided over part of the circumference not only serves to prevent loss of the closing element but also makes it possible to specifically influence the direction of flow of the fluid. Since a diameter of the closing element is smaller than a minimum inside diameter of the protruding area 6, the impedance of a flow in proximity to the protruding area 6 is avoided.

A valve 1 according to the disclosure in the exemplary embodiments described therefore has an end of the valve seat 5, lying in the direction of flow, of a design that differs from the known types of valve owing to the provision of the protruding area 6. The disclosure is preferably used in connection with a non-return valve in brake systems.

The invention claimed is:
1. A valve for controlling fluids, comprising:
a valve body defining a passage opening at an upper portion of the valve body;
a tapering valve seat formed on the upper portion of the valve body and encircling the passage opening;
a closing element configured to open and to close the passage opening by moving away from and contacting, respectively, the tapering valve seat; and
a protruding area at a first upper portion of the tapering valve seat, wherein:
the protruding area only extends over part of a circumference of the tapering valve seat;
the protruding area defines a length defined in a lifting direction of the closing element;
the length defined in the lifting direction is greater than a maximum lift of the closing element; and
the protruding area is only formed on less than one half of the circumference of the tapering valve seat and more than a third of the circumference of the tapering valve seat.

2. The valve as claimed in claim 1, wherein the protruding area and the tapering valve seat are integrally formed with one another.
3. The valve as claimed in claim 1, wherein:
the protruding area includes a castellated formation structure having a plurality of protruding elements that protrude above the tapering valve seat, and
the elements of the plurality of protruding elements are separated from one another by a plurality of spaces.
4. The valve as claimed in claim 3, wherein:
each space of the plurality of spaces defines a first arc length in a circumferential direction,
each element of the plurality of elements defines a second arc length in the circumferential direction, and
the first arc length is the same as the second arc length.
5. The valve as claimed in claim 1, wherein the tapering valve seat has a conical taper.
6. The valve as claimed in claim 1, wherein the valve is configured as a non-return valve.
7. The valve as claimed in claim 1, further comprising a non-protruding area at a second upper portion of the valve seat, the non-protruding area extending contiguously about the tapering valve seat for at least 180°.
8. The valve as claimed in claim 1, wherein:
the tapering valve seat has a first circumference at an upper end and a second circumference at a lower end, and
the first circumference is greater than the second circumference.
9. The valve as claimed in claim 8, wherein the closing element is configured to seal against the tapering valve seat at a position between the upper and lower ends of the tapering valve seat.
10. The valve as claimed in claim 1, wherein the protruding area is configured to radially guide the closing element in an open position of the valve.
11. A brake device for vehicles, comprising:
a valve configured to control fluids including (i) a valve body defining a passage opening at an upper portion of the valve body, (ii) a tapering valve seat formed on the upper portion of the valve body and encircling the passage opening, (iii) a closing element configured to open and to close the passage opening by moving away from and contacting, respectively, the tapering valve seat, and (iv) a protruding area at a first upper portion of the tapering valve seat, wherein:
the protruding area only extends over part of a circumference of the tapering valve seat; and
the protruding area is configured to radially guide the closing element in an open position of the valve.
12. The brake device as claimed in claim 11, the valve further comprising a non-protruding area at a second upper portion of the valve seat, the non-protruding area extending contiguously about the tapering valve seat for at least 180°.
13. A valve for controlling fluids, comprising:
a valve body defining a passage opening at an upper portion of the valve body;
a tapering valve seat formed on the upper portion of the valve body and encircling the passage opening;
a closing element configured to open and to close the passage opening by moving away from and contacting, respectively, the tapering valve seat; and
a protruding area at a first upper portion of the tapering valve seat, wherein:
the protruding area only extends over part of a circumference of the tapering valve seat; and
the protruding area is configured to radially guide the closing element in an open position of the valve.

14. The valve as claimed in claim 13, further comprising a non-protruding area at a second upper portion of the valve seat, the non-protruding area extending contiguously about the tapering valve seat for at least 180°.

15. The valve as claimed in claim 13, wherein:
   the protruding area includes a castellated formation structure having a plurality of protruding elements that protrude above the tapering valve seat, and
   the elements of the plurality of protruding elements are separated from one another by a plurality of spaces.

16. The valve as claimed in claim 15, wherein:
   each space of the plurality of spaces defines a first arc length in a circumferential direction,
   each element of the plurality of elements defines a second arc length in the circumferential direction, and
   the first arc length is the same as the second arc length.

17. The valve as claimed in claim 13, wherein the protruding area is only formed on less than one half of the circumference of the tapering valve seat and more than a third of the circumference of the tapering valve seat.

\* \* \* \* \*